(12) United States Patent
Park et al.

(10) Patent No.: US 11,895,603 B2
(45) Date of Patent: Feb. 6, 2024

(54) FRAME STRUCTURE AND TERMINAL SYNCHRONIZATION METHOD AND APPARATUS IN WIRELESS COMMUNICATION SYSTEM

(71) Applicant: Electronics and Telecommunications Research Institute, Daejeon (KR)

(72) Inventors: Tae Joon Park, Daejeon (KR); Eun Hee Kim, Daejeon (KR); Jae Sun Cha, Daejeon (KR); Jung Hoon Oh, Daejeon (KR); Kye Seon Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 184 days.

(21) Appl. No.: 17/533,833

(22) Filed: Nov. 23, 2021

(65) Prior Publication Data
US 2022/0167287 A1 May 26, 2022

(30) Foreign Application Priority Data

Nov. 25, 2020 (KR) .................. 10-2020-0160533
Nov. 12, 2021 (KR) .................. 10-2021-0155523

(51) Int. Cl.
*H04W 56/00* (2009.01)
*H04W 28/04* (2009.01)

(52) U.S. Cl.
CPC ......... *H04W 56/001* (2013.01); *H04W 28/04* (2013.01)

(58) Field of Classification Search
CPC .................. H04W 28/04; H04W 56/001
See application file for complete search history.

(56) References Cited

U.S. PATENT DOCUMENTS

| 9,647,816 | B2 | 5/2017 | Yu et al. |
| 10,045,374 | B2 | 8/2018 | Attar et al. |
| 10,334,540 | B2 | 6/2019 | Jeong et al. |
| 10,608,791 | B2 | 3/2020 | Chun et al. |
| 2015/0296544 | A1 | 10/2015 | Kim et al. |
| 2017/0331670 | A1* | 11/2017 | Parkvall ............... H04W 24/10 |

(Continued)

FOREIGN PATENT DOCUMENTS

| KR | 10-2013-0063940 | 6/2013 |
| KR | 10-2016-0009918 | 1/2016 |

(Continued)

*Primary Examiner* — Chi H Pham
*Assistant Examiner* — Ladislav Y Agureyev
(74) *Attorney, Agent, or Firm* — KILE PARK REED & HOUTTEMAN

(57) ABSTRACT

An operation method of an access point (AP) and a terminal, in a wireless time sensitive network (WTSN), may comprise: receiving, by an AP, an uplink frame from a first terminal; generating compensation indication information for compensation to be performed in the first terminal according to channel information between the first terminal and the AP estimated based on the uplink frame; transmitting the compensation indication information to the first terminal through a downlink frame; and performing, by the first terminal, the compensation based on the compensation indication message transmitted through the downlink frame.

17 Claims, 7 Drawing Sheets

(56) References Cited

U.S. PATENT DOCUMENTS

| | | | |
|---|---|---|---|
| 2018/0146506 A1* | 5/2018 | Zhang | H04W 56/001 |
| 2018/0317186 A1* | 11/2018 | Fan | H04L 5/0035 |
| 2019/0007941 A1* | 1/2019 | Cavalcanti | H04B 7/2656 |
| 2019/0190762 A1 | 6/2019 | Lee et al. | |
| 2019/0363843 A1* | 11/2019 | Gordaychik | H04L 1/08 |
| 2019/0364492 A1* | 11/2019 | Azizi | H04W 76/14 |
| 2020/0028745 A1* | 1/2020 | Parkvall | H04L 41/0816 |
| 2020/0228934 A1 | 7/2020 | HomChaudhuri et al. | |
| 2020/0259896 A1* | 8/2020 | Sachs | H04J 3/0667 |
| 2020/0319324 A1* | 10/2020 | Au | H04W 48/16 |
| 2020/0322908 A1* | 10/2020 | Prakash | H04W 56/001 |
| 2020/0404697 A1 | 12/2020 | Yang et al. | |
| 2021/0153193 A1* | 5/2021 | Lin | H04W 56/0065 |
| 2021/0336827 A1* | 10/2021 | Park | H04L 1/0069 |
| 2022/0240326 A1* | 7/2022 | Rune | H04W 56/001 |
| 2022/0361128 A1* | 11/2022 | Singh | H04W 56/001 |

FOREIGN PATENT DOCUMENTS

| | | | |
|---|---|---|---|
| KR | 10-2016-0010339 | 1/2016 | |
| KR | 10-2017-0065523 | 6/2017 | |
| KR | 10-2018-0050881 | 5/2018 | |
| KR | 10-2020-0065539 | 6/2020 | |
| WO | WO-2019125396 A1 * | 6/2019 | H04W 72/0406 |
| WO | WO-2019236052 A1 * | 12/2019 | |

\* cited by examiner

FRAME STRUCTURE AND TERMINAL SYNCHRONIZATION METHOD AND APPARATUS IN WIRELESS COMMUNICATION SYSTEM

CROSS-REFERENCE TO RELATED APPLICATIONS

This application claims priority to Korean Patent Applications No. 10-2020-0160533 filed on Nov. 25, 2020, and No. 10-2021-0155523 filed on Nov. 12, 2021 with the Korean Intellectual Property Office (KIPO), the entire contents of which are hereby incorporated by reference.

BACKGROUND

1. Technical Field

The present disclosure relates to a frame structure and a terminal synchronization method and apparatus in a wireless communication system, and more particularly, to a frame structure for a wireless time sensitive networking (WTSN) having an industrial closed-loop control level, and methods and apparatuses for synchronization between a plurality of terminals when the plurality of terminals access an access point (AP) in a time division multiple access (TDMA) scheme.

2. Related Art

In industrial manufacturing sites, for real-time monitoring and controls, a time deterministic service having a low latency, low delay variation, and low packet loss is provided by applying an Ethernet-based time sensitive network (TSN). The TSN has been operated based on a wired network, but wireless communication is required where it is difficult to communicate with sensors and actuators for real-time monitoring and controls.

In the WiFi-based communication system, a receiving node may extract and compensate for a carrier frequency error and a symbol timing error of a transmitting node by using a physical layer preamble to perform data reception. Accordingly, in the conventional WiFi-based communication system, a preamble is absolutely necessary for data transmission and reception. However, in order to apply the closed-loop controls such as in production processes for industrial automation and robot controls, continuous data transmission is required at a sufficiently short periodicity (e.g., 125 us). However, when the size of the data to be transmitted is smaller than the size of the preamble, the data transmission efficiency is lowered, and when the periodicity is sufficiently short (e.g., 125 us), the short periodicity for data transmission may not be satisfied due to a time required for transmission of the preamble.

SUMMARY

Accordingly, exemplary embodiments of the present disclosure are directed to providing an operation method of an access point (AP) for a WTSN.

Accordingly, exemplary embodiments of the present disclosure are directed to providing an operation method of a terminal or station (STA) for the WTSN.

Accordingly, exemplary embodiments of the present disclosure are directed to providing a configuration of the terminal for the WTSN.

According to a first exemplary embodiment of the present disclosure, an operation method of an access point (AP) in a WTSN may comprise: receiving an uplink frame from a first terminal; generating compensation indication information for compensation to be performed in the first terminal according to channel information between the first terminal and the AP estimated based on the uplink frame; and transmitting the compensation indication information to the first terminal through a downlink frame.

The uplink frame may include: a common preamble; and an uplink data unit for each of a plurality of terminals including the first terminal, wherein an uplink data unit for the first terminal includes an uplink U-header and a data field.

The uplink U-header may include a guard interval (GI) and a training field.

The GI may have a length of 0.8 usec, the training field may be configured as a reduced legacy short training field (L-STF) or a reduced legacy long training field (L-LTF), and the training filed may have a length of 3.2 usec.

The downlink frame may include: a common preamble; and a data unit for each of a plurality of terminals including the first terminal, wherein a data unit for the first terminal includes a downlink U-header and a data field.

The compensation indication information may be transmitted by being included in the downlink U-header in case of initial control or when an in-band control scheme is used.

The compensation indication information may be transmitted by being included in an out-of-band control message when an out-of-band control scheme is used, and resources of the downlink U-header may be used for transmission of data for the first terminal.

The compensation indication information may be composed of information indicating compensation for a transmission power of the first terminal, a timing offset for a channel between the first terminal and the AP, and/or a frequency offset for the channel.

According to a second exemplary embodiment of the present disclosure, an operation method of a first terminal in a WTSN may comprise: transmitting an uplink frame to an access point (AP); receiving a downlink frame from the AP, the downlink frame including compensation indication information indicating compensation to be performed by the first terminal based on channel information between the first terminal and the AP estimated based on the uplink frame; and performing the compensation based on the compensation indication information.

The uplink frame may include: a common preamble; and an uplink data unit for each of a plurality of terminals including the first terminal, wherein an uplink data unit for the first terminal includes an uplink U-header and a data field.

The uplink U-header may include a guard interval (GI) and a training field.

The GI may have a length of 0.8 usec, the training field may be configured as a reduced legacy short training field (L-STF) or a reduced legacy long training field (L-LTF), and the training filed may have a length of 3.2 usec.

The downlink frame may include: a common preamble; and a data unit for each of a plurality of terminals including the first terminal, wherein a data unit for the first terminal includes a downlink U-header and a data field.

The compensation indication information may be transmitted by being included in the downlink U-header in case of initial control or when an in-band control scheme is used.

The compensation indication information may be transmitted by being included in an out-of-band control message when an out-of-band control scheme is used, and resources of the downlink U-header may be used for transmission of data for the first terminal.

The compensation indication information may be composed of information indicating compensation for a transmission power of the first terminal, a timing offset for a channel between the first terminal and the AP, and/or a frequency offset for the channel.

According to a third exemplary embodiment of the present disclosure, a first terminal operation in a WTSN may comprise: a processor; a memory storing instructions executable by the processor; and a transceiver controlled by the processor, wherein when executed by the processor, the instructions cause the processor to: transmit an uplink frame to an access point (AP) through the transceiver; receive a downlink frame from the AP through the transceiver, the downlink frame including compensation indication information indicating compensation to be performed by the first terminal based on channel information between the first terminal and the AP estimated based on the uplink frame; and perform the compensation based on the compensation indication information.

The downlink frame may include: a common preamble; and a data unit for each of a plurality of terminals including the first terminal, wherein a data unit for the first terminal includes a downlink U-header and a data field.

The compensation indication information may be transmitted by being included in the downlink U-header in case of initial control or when an in-band control scheme is used.

The compensation indication information may be transmitted by being included in an out-of-band control message when an out-of-band control scheme is used, and resources of the downlink U-header may be used for transmission of data for the first terminal.

Using the exemplary embodiments of the present disclosure, it is made possible to timely transmit a small amount of data that is continuously generated at a very short transmission periodicity to a plurality of terminals, which could not be supported in the communication according to the existing WiFi technology. The exemplary embodiments of the present disclosure may be adapted to fields requiring a real-time closed-loop control, such as robot controls for industrial automation. For example, one AP may guarantee deterministic data transmission/reception opportunities for 120 terminals at a periodicity of 2 ms.

DETAILED DESCRIPTION OF THE EMBODIMENTS

Figure 1:
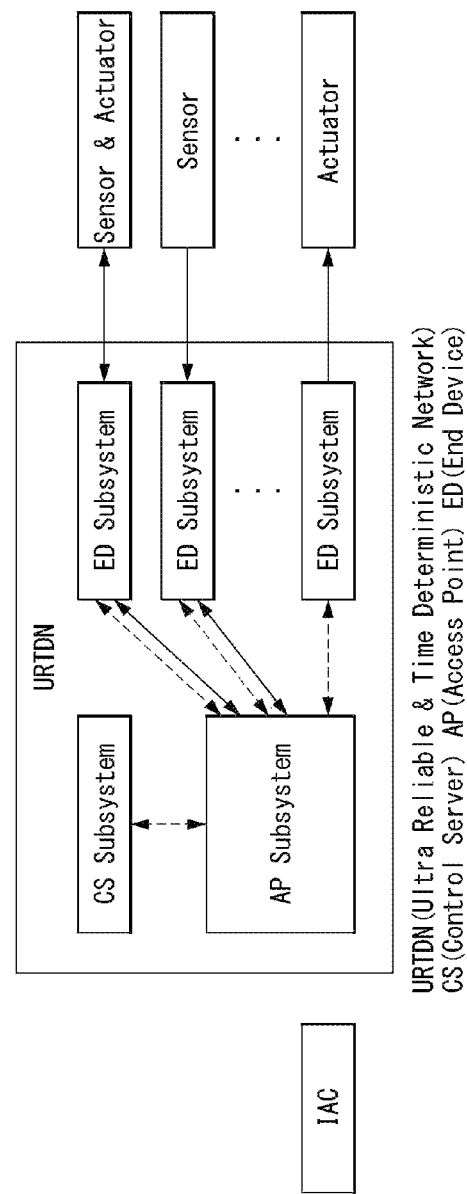
FIG. 1 is a conceptual diagram illustrating a highly reliable time-deterministic network environment to which exemplary embodiments of the present disclosure are applied.

Exemplary embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, a communication system may be used in the same meaning as a communication network.

Hereinafter, preferred exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a conceptual diagram illustrating a highly reliable time-deterministic network environment to which exemplary embodiments of the present disclosure are applied.

Referring to FIG. 1, an ultra-reliable and time-deterministic network (URTDN) including an access point (AP) subsystem (hereinafter referred to as 'AP') and a plurality of end device (ED) subsystems (hereinafter referred to as 'terminals') is shown. Each terminal may include or be connected to a sensor and/or an actuator.

Meanwhile, in the URTDN, an industrial closed-loop control level operation is required between the AP and the plurality of terminals. In the URTDN, the plurality of terminals may access the AP in a TDMA scheme, and all the terminals need to be synchronized with the AP. Accordingly, exemplary embodiments of the present disclosure provide a frame structure and terminal synchronization methods and apparatuses for a WTSN having an industrial closed-loop control level, which can be applied to data transmission/reception in the URTDN. In particular, provided are methods and apparatuses capable of compensating for errors in carrier frequencies and symbol timings of all the communication nodes based on the AP, so that all the terminals accessing the AP can transmit and receive without using a preamble according to the conventional method.

Figure 2:
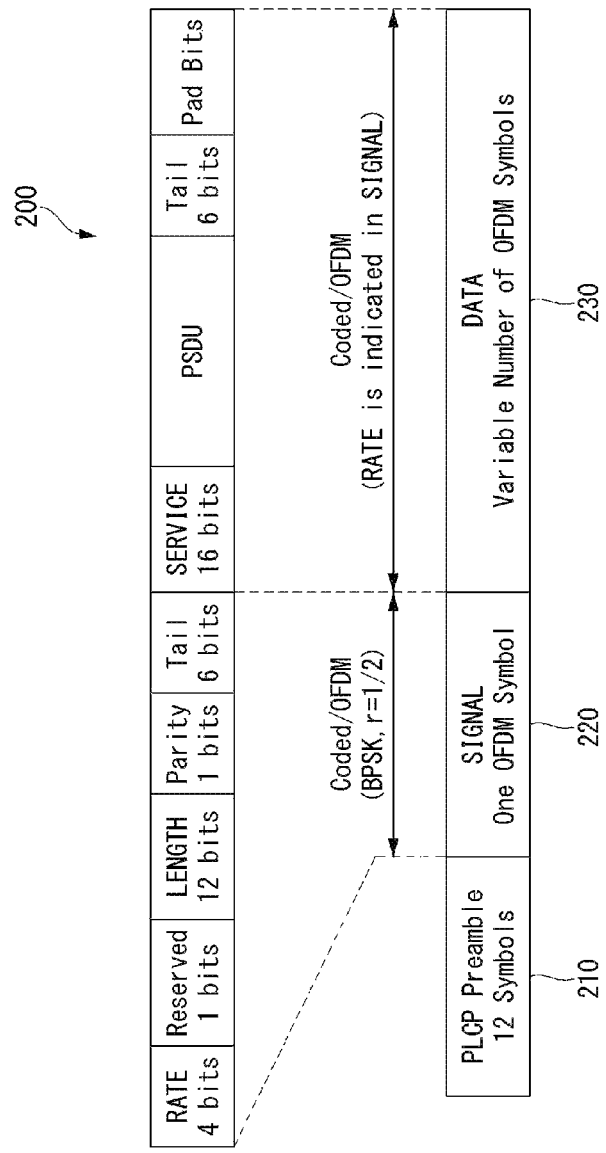
FIG. 2 is a conceptual diagram illustrating a structure of a physical layer frame defined in the existing IEEE 802.11 standard.
Figure 3:
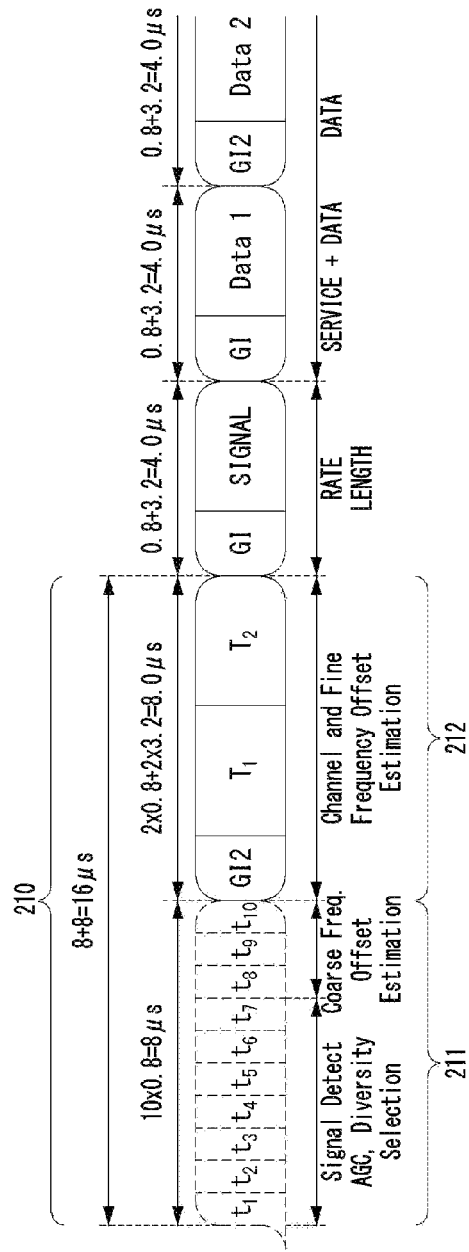
FIG. 3 is a conceptual diagram illustrating a preamble in the physical layer frame of FIG. 2 in detail.

FIG. 2 is a conceptual diagram illustrating a structure of a physical layer frame defined in the existing IEEE 802.11 standard, and FIG. 3 is a conceptual diagram illustrating a preamble in the physical layer frame of FIG. 2 in detail.

Referring to FIG. 2, a physical layer frame 200 according to the IEEE 802.11 standard may include a preamble 210, a control signal 220, and a data unit 230. For example, the control signal 220 may be a legacy signal (L-SIG) field used in the IEEE802.11 (a/g/n) frame. In this case, the L-SIG field may have a length of 4 usec. Meanwhile, the control signal 220 may have various fields (e.g., RATE, reserved, LENGTH, Parity, Tail, etc.), but a description thereof will be omitted.

Referring to FIG. 3, the preamble 210 may include a legacy short training field (L-STF) 211 and a legacy long training field (L-LTF) 212 used in the IEEE802.11 (a/g/n) frame. In this case, the L-STF may have a length of 8 usec, and the L-LTF may have a length of 8 usec. The L-STF is used for auto gain control (AGC) and coarse time synchronization in each terminal, and the L-LTF is used for fine time synchronization, frequency compensation, and channel estimation for demodulation of data in each terminal.

In the conventional WiFi-based communication system, a preamble is absolutely necessary for data transmission and reception. However, in order to apply the closed-loop controls such as in production processes for industrial automation and robot controls, continuous data transmission is required at a sufficiently short periodicity (e.g., 125 us). However, when the size of the data to be transmitted is smaller than the size of the preamble, the data transmission efficiency is lowered, and when the periodicity is sufficiently short (e.g., 125 us), the short periodicity for data transmission may not be satisfied due to a time required for transmission of the preamble.

For example, assuming a system in which one AP should guarantee deterministic data reception opportunities for 120 terminals at a periodicity of 2 ms, the smaller the size of user data between the AP and the terminal, the greater the overhead due to the preamble, thereby lowering the transmission efficiency. Such the problem may cause not only the problem of efficiency, but also a situation in which it becomes impossible to accommodate 120 terminals within a period of 2 ms. Accordingly, in downlink through which data is transmitted from the AP to the terminals, a frame aggregation technical concept may be applied to solve the efficiency problem due to the preamble.

Figure 4:
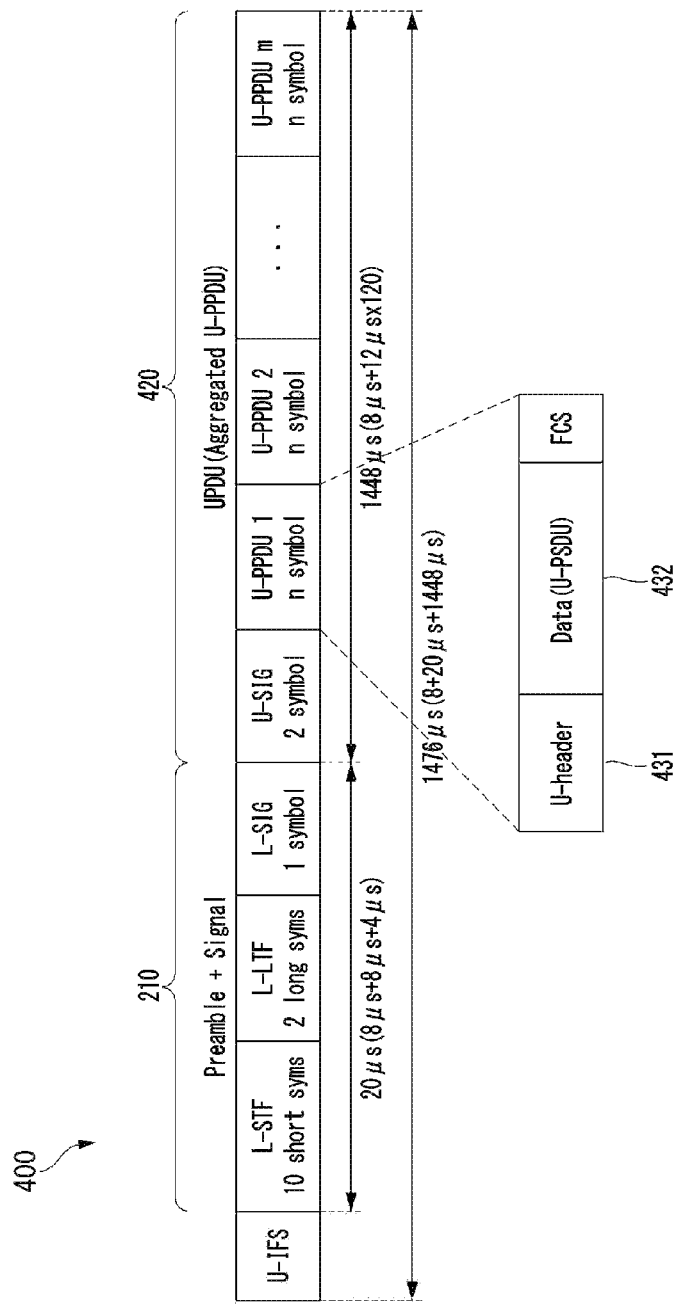
FIG. 4 is a conceptual diagram illustrating a structure of a downlink frame according to an exemplary embodiment of the present disclosure.

FIG. 4 is a conceptual diagram illustrating a structure of a downlink frame according to an exemplary embodiment of the present disclosure.

Referring to FIG. 4, a downlink frame 400 may include a preamble and a control signal 410 according to the prior arts, and data units 420. In this case, a frame aggregation scheme of aggregating and transmitting physical layer protocol data units (PPDUs) to a plurality of terminals is applied, so that the data units 420 may include downlink data units (e.g., PPDUs) for the plurality of terminals (e.g., 120 terminals). In addition, the downlink frame 400 may further include a URTDN control signal (U-SIG) field. Meanwhile, the data unit for each terminal may include a URTDN (U)-header 431 and a data field (i.e., protocol service data unit (PSDU)) 432.

That is, in the downlink frame shown in FIG. 4, the first 3 bytes (bit 23 to bit 0) of the data unit for each terminal may be used as a downlink U-header for each terminal. The downlink U-header may be configured differently according to an in-band control scheme or an out-of-band control scheme to be described later.

Accordingly, the downlink frame 400 may reduce preamble overheads compared to the conventional scheme in which a preamble is transmitted for each PPDU (e.g., the frame structure of FIG. 2). However, in case of uplink, transmissions from different terminals to the AP are performed, and thus, the frame aggregation scheme applied to the downlink frame cannot be applied to an uplink frame. Therefore, hereinafter, a preamble simplification method that can expect a high transmission efficiency similar to that of the frame aggregation scheme will be proposed for uplink frame transmission.

Figure 5:
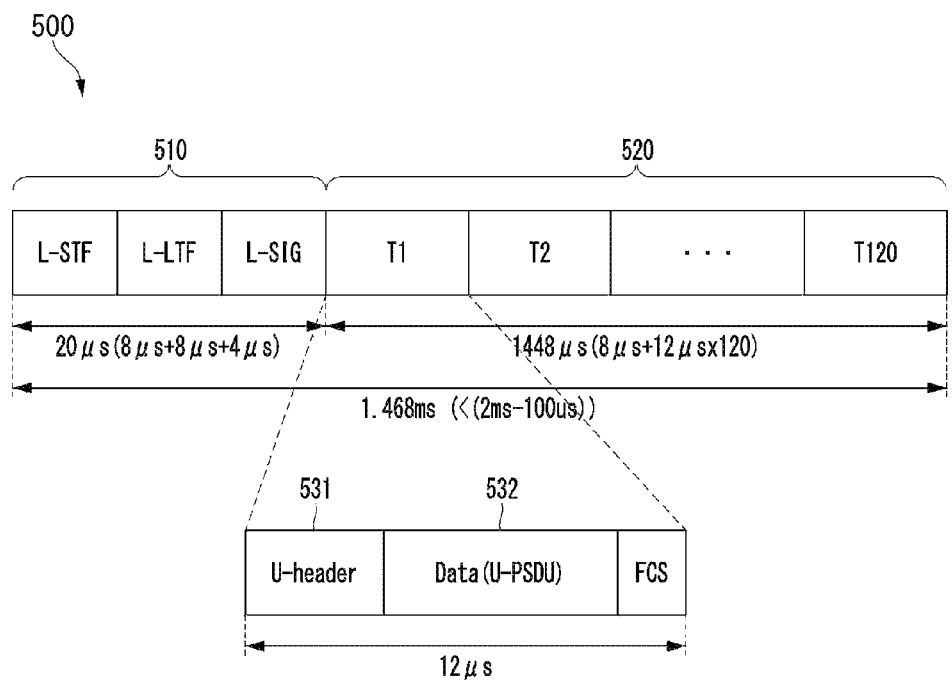
FIG. 5 is a conceptual diagram illustrating a structure of an uplink frame according to an exemplary embodiment of the present disclosure.

FIG. 5 is a conceptual diagram illustrating a structure of an uplink frame according to an exemplary embodiment of the present disclosure.

An uplink frame of FIG. 5 may be started after a predetermined time elapses after the downlink frame of FIG. 4 is received, by reflecting a symbol synchronization acquired in the corresponding reception process. Since frequent gain control and frequency offset control are required to receive short packets, if a part of the preamble is removed or simplified in order to reduce the overhead of the preamble, severe deterioration of communication characteristics may occur. Therefore, in order to supplement the problem caused by partial removal or simplification of the preamble, methods capable of supplementing the role of the existing preamble for normal uplink communication may be applied as follows.

As a first scheme, the AP may identify information on a channel attenuation, frequency offset, and/or phase error for each terminal based on an uplink frame transmitted by each terminal. The AP may notify each terminal of the identified information (by using an in-band control scheme or an out-of-band scheme to be described later), and each terminal may perform pre-compensation for the channel attenuation, frequency offset, and/or phase error for isochronous communications.

As a second scheme, each terminal may estimate a channel attenuation, frequency offset, and/or phase error between the AP and each terminal based on a downlink frame (e.g., preamble of the downlink frame) transmitted from the AP, and perform compensation according to the estimated channel attenuation, frequency offset, and/or phase error. To this end, a start time of the uplink frame of FIG. 5 may be set to a time point after a predetermined time elapses from an end time of the downlink frame of FIG. 4.

As a third scheme, a combination of the two schemes described above may be applied. That is, the compensation according to the channel attenuation, frequency offset, and/or phase error measured and notified by the AP based on the uplink frame, and the compensation according to the channel attenuation, frequency offset, and/or phase error measured by the terminal based on the downlink frame may be performed together.

Meanwhile, specific methods for acquiring the channel information (e.g., attenuation, frequency offset, etc.) are generally known, and will not be specifically described in the present disclosure.

Referring again to FIG. 5, the uplink frame 500 may include a preamble and a control signal 510 according to the prior arts and data units 520 of terminals. For example, there may be data units (PPDUs) for 120 terminals. In FIG. 5, a data unit T1 for a first terminal is enlarged for convenience of description.

The data unit for each terminal may include a U-header 531 and a data field 532. The U-header may be a header applied to each terminal, and may be located in the first symbol of a data unit (PPDU) transmitted by each terminal to the AP.

On the other hand, the U-header (e.g., 431) of the downlink frame may be used to transfer the information from the AP to each terminal according to the first scheme described above. That is, the information on the channel attenuation, frequency offset, and/or phase error experienced by each terminal, which are measured by the AP based on the uplink frame transmitted by each terminal, may be transmitted to each terminal using the U-header of the downlink frame (in the case of the in-band control scheme). Each terminal may perform compensation for its uplink transmission by using the information transmitted through the U-header of the downlink frame. That is, the offset and transmission power of each terminal may be compensated using the U-header of the downlink frame so that the AP can easily receive the frame.

Figure 6:
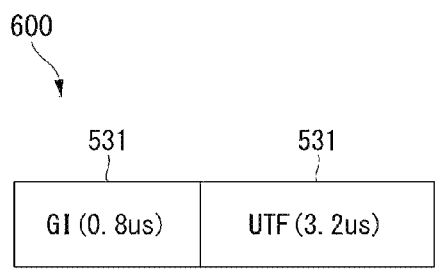
FIG. 6 is a conceptual diagram illustrating a structure of an uplink U-header according to an exemplary embodiment of the present disclosure.

FIG. 6 is a conceptual diagram illustrating a structure of an uplink U-header according to an exemplary embodiment of the present disclosure.

Referring to FIG. 6, an uplink U-header 600 may include a guard interval GI 610 (i.e., inter-user guard interval for increasing a probability of successful reception of URTDN data) and a URTDN training field (UTF) 620 for time/frequency synchronization and channel response estimation.

The length of the GI 610 may be determined by reflecting uncertainty due to a frequency offset and a transmission delay. The GI may reflect the maximum error and the maximum transmission delay that may occur due to a frequency offset in the URTDN operating based on an isochronous scheme where time information is periodically resynchronized. For example, the GI may have a length of 0.8 usec.

The UTF 620 may be used for coarse tuning and fine tuning instead of the L-STF and L-LTF according to the prior arts. The UTF 620 may be configured as a U-STF simplified from the conventional L-STF or a U-LTF simplified from the conventional L-LTF according to a request of the AP. For example, the U-STF may have a structure in which eight sequences constituting the conventional L-STF are reduced to four sequences, and the U-LTF may have a structure in which two sequences constituting the conventional L-LTF are reduced to one sequence. For example, each of the U-STF and the U-LTF may have a length of 3.2 usec.

Figure 7:
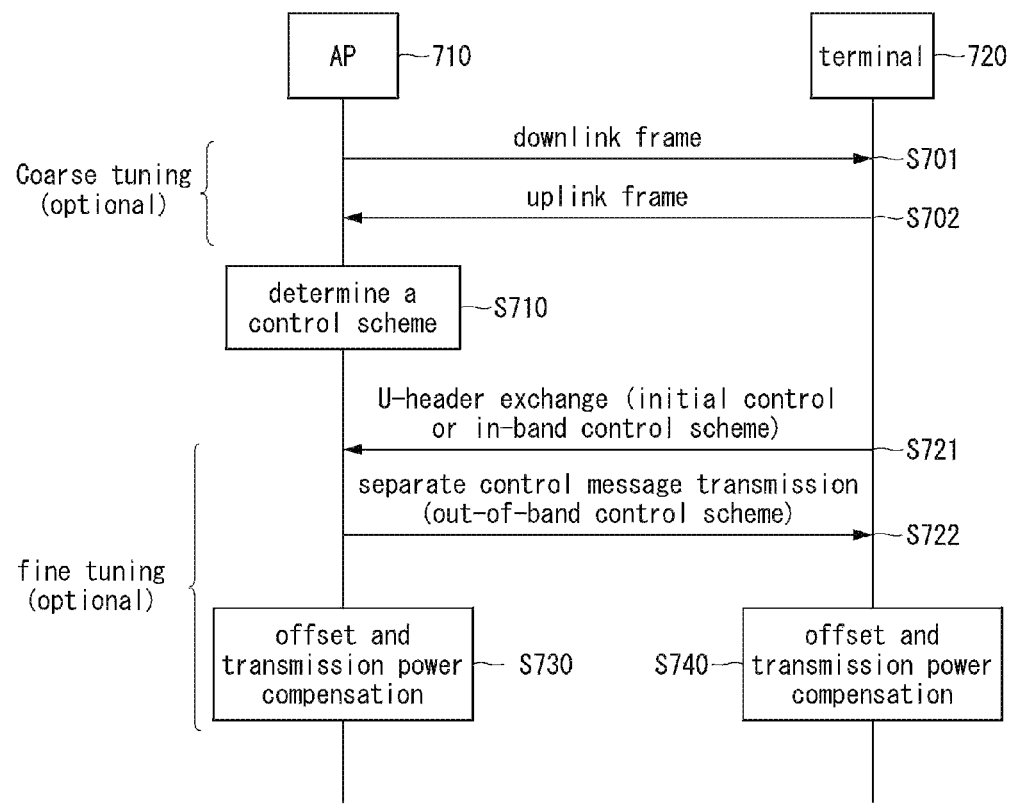
FIG. 7 is a sequence chart illustrating an uplink synchronization control method according to an exemplary embodiment of the present disclosure.

FIG. 7 is a sequence chart illustrating an uplink synchronization control method according to an exemplary embodiment of the present disclosure.

Referring to FIG. 7, an AP 710 and a terminal 720 may first perform coarse tuning. The coarse tuning may be an optional procedure. In the coarse tuning, a closed-loop uplink synchronization procedure according to the in-band or out-of-band control scheme, which will be described later, may not be performed.

In the coarse tuning procedure, the AP 710 may transmit a downlink frame to the terminal 720, and the terminal 720 may receive the downlink frame transmitted from the AP 710 (S701). The terminal may estimate a channel attenuation, frequency offset, and/or phase error between the AP and each terminal based on the receive downlink frame (i.e., preamble of the downlink frame), and perform compensation according to the estimated channel attenuation, frequency offset, and/or phase error.

On the other hand, the terminal 720 may transmit an uplink frame to the AP 710, and the AP 710 may receive the uplink frame transmitted from the terminal 720 (S702). The AP may estimate a channel attenuation, frequency offset, and/or phase error between the AP and each terminal based on the received uplink frame (i.e., preamble of the uplink frame and/or the UTF of the uplink U-header), and perform compensation according to the estimated channel attenuation, frequency offset, and/or phase error.

Thereafter, a fine tuning procedure according to an exemplary embodiment of the present disclosure may be initiated. For the fine tuning procedure, the in-band control scheme or the out-of-band control scheme may be used. The AP 710 may select a control scheme to be applied from among the in-band control scheme and the out-band control scheme (S710).

The AP 710 may generate compensation indication information for compensation to be performed by the terminal 720 based on the channel information between the terminal 720 and the AP 710, which is estimated based on the uplink frame (i.e., the preamble of the uplink frame and/or the UTF of the uplink U-header) received from the terminal 720. The in-band control scheme and the out-band control scheme may refer to schemes in which the AP 710 transmits the compensation indication information to the terminal 720.

In the in-band control scheme, the AP 710 and the terminal 720 may continuously exchange downlink/uplink U-headers, and use the U-headers to compensation for uplink transmission (i.e., compensation of a transmission power, timing offset, and/or frequency offset for the uplink transmission).

In the out-band control scheme, downlink/uplink U-headers may be used only for initial fine tuning. That is, when a 'payload type' of the U-header, which will be described later, is changed to 'DATA', resources for the U-header may be used for data transmission. Except for the initial fine tuning, the above-described compensation indication information may be transmitted to the terminal using an out-of-band control message instead of the U-header.

Accordingly, in the case of initial control or when the in-band control scheme is applied, the AP 710 may transmit a downlink frame including the downlink U-header including the compensation indication information, and the terminal 720 may transmit an uplink frame including the uplink U-header (S721). On the other hand, when the out-band control scheme is applied, the AP 710 may transmit the compensation indication information to the terminal 720 by using an out-of-band control message (S722).

Table 1 below is a table showing an example of a downlink U-header composed of 3 bytes (24 bits).

TABLE 1

| bits | Description | Default value |
|---|---|---|
| 23 | Active = 1 | 0 |
| 22 | Downlink payload type<br>0: CONTROL (L-LTF, SIGNAL)<br>1: DATA | 0 |
| 21~20 | Uplink control message (AP → terminal)<br>00: NOP (NO operation)<br>01: transmission (TX) power<br>10: timing offset compensation<br>11: frequency offset compensation | 00 |
| 19 | Uplink control value sign<br>0: decrease (−)<br>1: increase (+)<br>Valid only when the uplink control message is not set to '00' | 0 |
| 18~16 | Uplink control value (AP → terminal)<br>000~111<br>Valid only when the uplink control message is not set to '00 | 0 |
| 15 | Uplink U-header type<br>0: U-STF<br>1: U-LTF | 0 |
| 14~13 | Uplink payload type<br>00: L-STF<br>01: L-LTF<br>10: CONTROL (SIGNAL)<br>11: DATA | 00 |
| 12~0 | Reserved | 0 |

In Table 1, when the 'downlink payload type' is set to 'DATA', resources for the downlink U-header may be used for data transmission, not for transmission of the compensation indication information. For example, after the 'downlink payload type' is set to 'DATA', the downlink U-header may no longer exist in the data unit for each terminal.

The 'uplink control message' may be information for the AP 710 to indicate a compensation target to the terminal 720, and may indicate that a transmission power, a timing offset, or a frequency offset is a compensation target or there is no compensation target (i.e., NOP). When the 'uplink control message' is not set to NOP, the 'uplink control value sign' and the 'uplink control value' may indicate a direction (i.e., increase or decrease) of the control value for the compensation target (i.e., transmission power, timing offset, or frequency offset), and the amount of change for the compensation target, respectively.

Table 2 is a table showing an example of a downlink U-header composed of 2 bytes (16 bits). The U-header of Table 2 may have reduced information compared to Table 1. However, the information included in the U-header of Table 2 is similar to the information of Table 1.

TABLE 2

| bits | Description | Default value |
|---|---|---|
| 15 | Active = 1 | 0 |
| 14 | Downlink payload type<br>0: CONTROL (L-LTF, SIGNAL)<br>1: DATA | 0 |
| 13-12 | Uplink control message (AP → terminal)<br>00: NOP (NO operation)<br>01: transmission (TX) power<br>10: timing offset compensation<br>11: frequency offset compensation | 00 |
| 11 | Uplink control value sign<br>0: decrease (−)<br>1: increase (+)<br>Valid only when the uplink control message is not set to '00' | 0 |
| 10-8 | Uplink control value (AP → terminal)<br>000~111<br>Valid only when the uplink control message is not set to '00 | 0 |
| 7-0 | Current sequence number | 0 |

Figure 8:
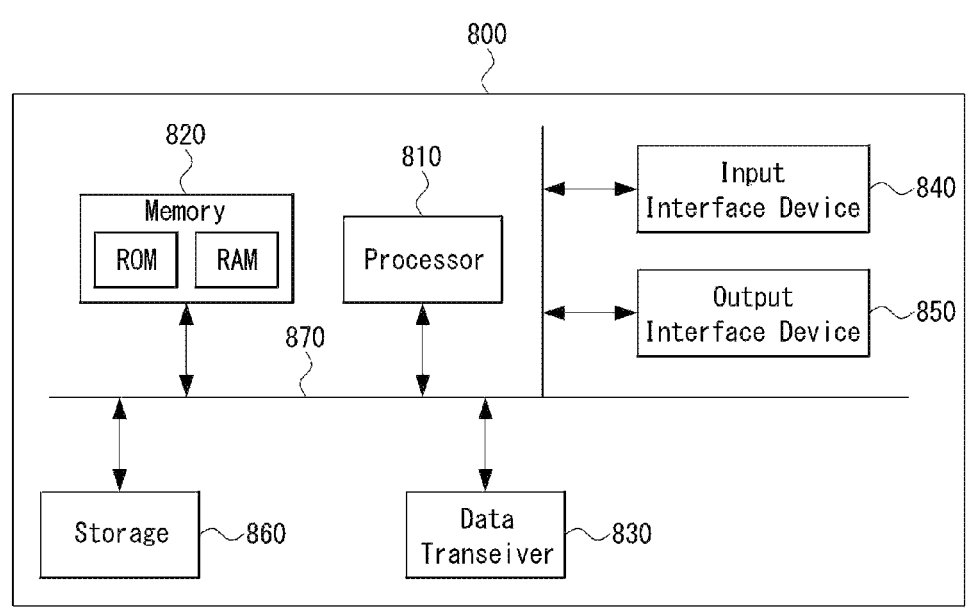
FIG. 8 is a block diagram illustrating a configuration of a communication node according to an exemplary embodiment of the present disclosure.

FIG. 8 is a block diagram illustrating a configuration of a communication node according to an exemplary embodiment of the present disclosure.

The communication node described with reference to FIG. 8 may be the AP and/or the terminal described above. Referring to FIG. 8, a communication node 800 may comprise at least one processor 810, a memory 820, and a transceiver 830 connected to the network for performing communications. Also, the communication node 800 may further comprise an input interface device 840, an output interface device 850, a storage device 860, and the like. The respective components included in the communication node 800 may communicate with each other as connected through a bus 870. However, each component included in the communication node 800 may be connected to the processor 810 via an individual interface or a separate bus, rather than the common bus 870. For example, the processor 810 may be connected to at least one of the memory 820, the transceiver 830, the input interface device 840, the output interface device 850, and the storage device 860 via a dedicated interface.

The processor 810 may execute a program stored in at least one of the memory 820 and the storage device 860. The processor 810 may refer to a central processing unit (CPU), a graphics processing unit (GPU), or a dedicated processor on which methods in accordance with embodiments of the present disclosure are performed. Each of the memory 820 and the storage device 860 may be constituted by at least one of a volatile storage medium and a non-volatile storage medium. For example, the memory 820 may comprise at least one of read-only memory (ROM) and random access memory (RAM).

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of an access point (AP) in a wireless time sensitive network (WTSN), the operation method comprising:
    receiving an uplink frame from a first terminal;
    generating compensation indication information for compensation to be performed in the first terminal according to channel information between the first terminal and the AP estimated based on the uplink frame; and
    transmitting the compensation indication information to the first terminal through a downlink frame,
    wherein the uplink frame includes:
    a common preamble; and
    an uplink data unit for each of a plurality of terminals including the first terminal,
    wherein an uplink data unit for the first terminal includes an uplink U-header and a data field.

2. The operation method according to claim 1, wherein the uplink U-header includes a guard interval (GI) and a training field.

3. The operation method according to claim 2, wherein the GI has a length of 0.8 usec, the training field is configured as a reduced legacy short training field (L-STF) or a reduced legacy long training field (L-LTF), and the training filed has a length of 3.2 usec.

4. The operation method according to claim 1, wherein the downlink frame includes:
    a common preamble; and
    a data unit for each of a plurality of terminals including the first terminal,
    wherein a data unit for the first terminal includes a downlink U-header and a data field.

5. The operation method according to claim 4, wherein the compensation indication information is transmitted by being included in the downlink U-header in case of initial control or when an in-band control scheme is used.

6. The operation method according to claim 4, wherein the compensation indication information is transmitted by being included in an out-of-band control message when an out-of-band control scheme is used, and resources of the downlink U-header are used for transmission of data for the first terminal.

7. The operation method according to claim 1, wherein the compensation indication information is composed of information indicating compensation for a transmission power of the first terminal, a timing offset for a channel between the first terminal and the AP, and/or a frequency offset for the channel.

8. An operation method of a first terminal in a wireless time sensitive network (WTSN), the operation method comprising:
    transmitting an uplink frame to an access point (AP);
    receiving a downlink frame from the AP, the downlink frame including compensation indication information indicating compensation to be performed by the first terminal based on channel information between the first terminal and the AP estimated based on the uplink frame; and
    performing the compensation based on the compensation indication information,
    wherein the uplink frame includes:
    a common preamble; and
    an uplink data unit for each of a plurality of terminals including the first terminal,
    wherein an uplink data unit for the first terminal includes an uplink U-header and a data field.

9. The operation method according to claim 8, wherein the uplink U-header includes a guard interval (GI) and a training field.

10. The operation method according to claim 9, wherein the GI has a length of 0.8 usec, the training field is configured as a reduced legacy short training field (L-STF) or a reduced legacy long training field (L-LTF), and the training filed has a length of 3.2 usec.

11. The operation method according to claim 8, wherein the downlink frame includes:
    a common preamble; and
    a data unit for each of a plurality of terminals including the first terminal,
    wherein a data unit for the first terminal includes a downlink U-header and a data field.

12. The operation method according to claim 11, wherein the compensation indication information is transmitted by being included in the downlink U-header in case of initial control or when an in-band control scheme is used.

13. The operation method according to claim 11, wherein the compensation indication information is transmitted by being included in an out-of-band control message when an out-of-band control scheme is used, and resources of the downlink U-header are used for transmission of data for the first terminal.

14. The operation method according to claim 8, wherein the compensation indication information is composed of information indicating compensation for a transmission power of the first terminal, a timing offset for a channel between the first terminal and the AP, and/or a frequency offset for the channel.

15. A first terminal operation in a wireless time sensitive network (WTSN), the first terminal comprising:
    a processor;
    a memory storing instructions executable by the processor; and
    a transceiver controlled by the processor,
    wherein when executed by the processor, the instructions cause the processor to:
    transmit an uplink frame to an access point (AP) through the transceiver;
    receive a downlink frame from the AP through the transceiver, the downlink frame including compensation indication information indicating compensation to be performed by the first terminal based on channel information between the first terminal and the AP estimated based on the uplink frame; and
    perform the compensation based on the compensation indication information, wherein the uplink frame includes:
a common preamble; and
an uplink data unit for each of a plurality of terminals including the first terminal,
wherein an data unit for the first terminal includes an downlink U-header and a data field.

16. The first terminal according to claim 15, wherein the compensation indication information is transmitted by being included in the downlink U-header in case of initial control or when an in-band control scheme is used.

17. The first terminal according to claim 15, wherein the compensation indication information is transmitted by being included in an out-of-band control message when an out-of-band control scheme is used, and resources of the downlink U-header are used for transmission of data for the first terminal.

* * * * *